C. C. F. REININGER.
TIRE REPLACER.
APPLICATION FILED SEPT. 18, 1918.
1,319,617.
Patented Oct. 21, 1919.
2 SHEETS—SHEET 2.
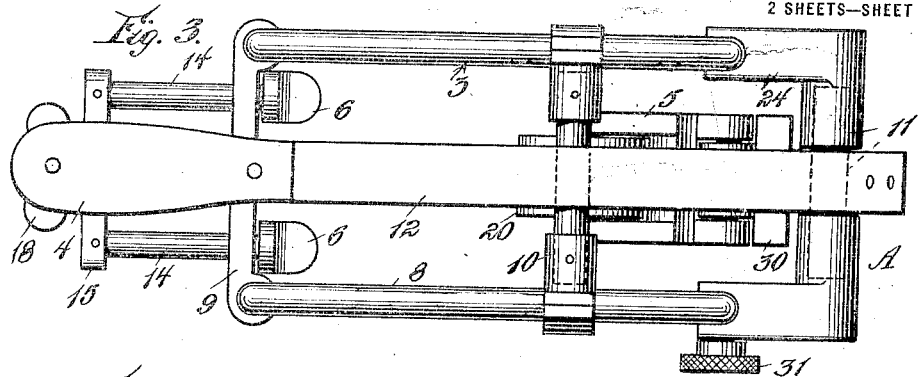
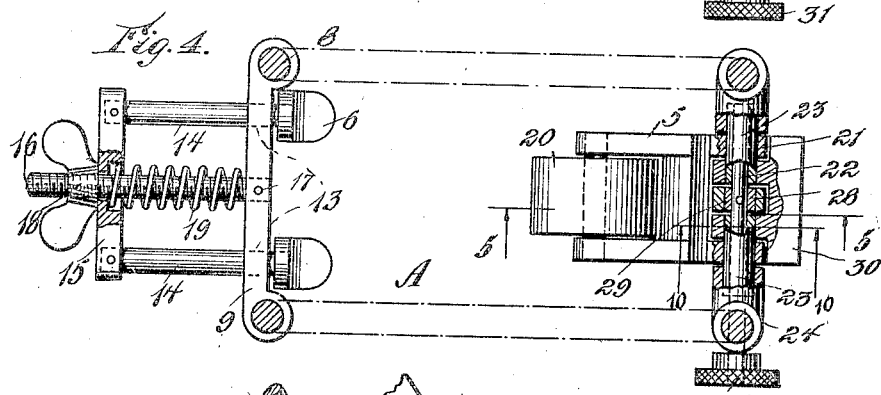
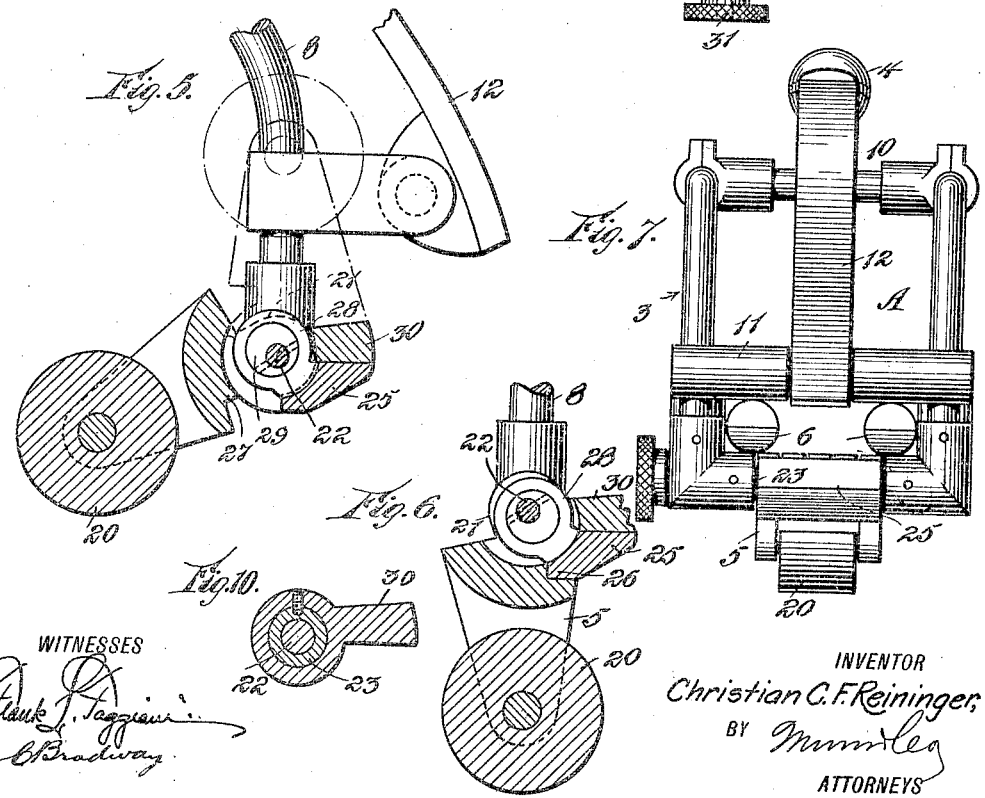
WITNESSES
INVENTOR
Christian C. F. Reininger,
BY
ATTORNEYS

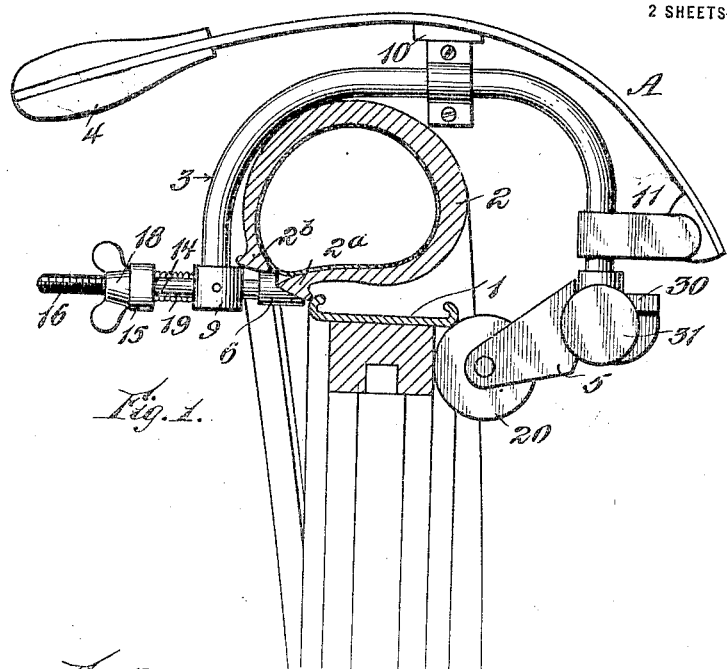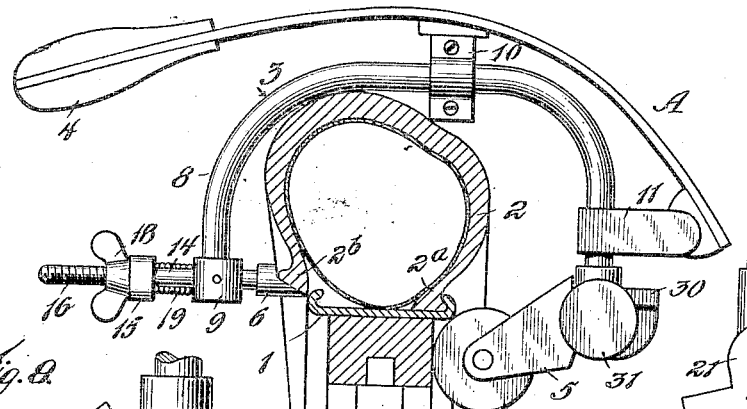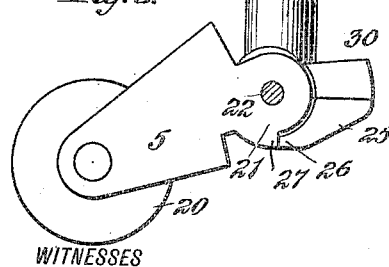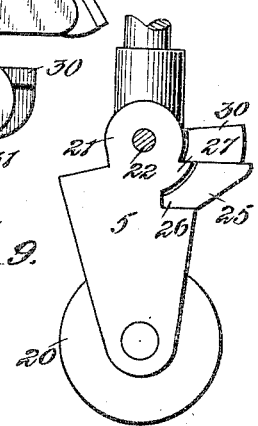

UNITED STATES PATENT OFFICE.

CHRISTIAN C. F. REININGER, OF NEW YORK, N. Y.

TIRE-REPLACER.

1,319,617.   Specification of Letters Patent.   Patented Oct. 21, 1919.

Application filed September 18, 1918. Serial No. 254,613.

*To all whom it may concern:*

Be it known that I, CHRISTIAN C. F. REININGER, a citizen of the United States, and a resident of the city of New York, Springfield Gardens, borough of Queens, county of Queens, and State of New York, have invented a new and Improved Tire-Replacer, of which the following is a full, clear, and exact description.

This invention relates to a tire tool especially designed for prying on to a wheel rim a pneumatic tire shoe or case.

The invention has for its general objects to provide a tool of novel construction which is operated in a simple manner for quickly and easily applying the tire shoe to a wheel rim, the tool being in the nature of a lever arranged to bear against one side of the felly as a fulcrum point and having adjustable members, first, for engaging the inner bead or base of the tire; and after such bead is applied to the rim the members are adjustable to a different position for engaging the outer or second bead of the tire to pry the same on to the rim, it being necessary to use the tool at about four points around the wheel in the prying operation for each bead.

A more specific object of the invention is the provision of a lever shaped to straddle the tire and wheel and having a member which can be adjusted to an open position, so that the lever can be applied over the tire, and when applied the member is rocked in its operative position to bring the fulcrum of the lever against the side of the wheel felly.

For a more complete understanding of the invention reference is to be had to the following description and claims taken in connection with the accompanying drawings which illustrate one embodiment of the invention, and in which similar reference characters are employed to designate corresponding parts in the several views.

Figure 1 is a transverse section of a wheel and tire showing the tool in the act of applying the first bead of the shoe to the rim.

Fig. 2 is a similar view showing the second bead being applied.

Fig. 3 is a plan view of the tool.

Fig. 4 is a horizontal section, portions broken away, with the fulcrum member in normal position.

Fig. 5 is a sectional view on the line 5—5, Fig. 4.

Fig. 6 is a similar view of the fulcrum member in open position.

Fig. 7 is a right-end view of Fig. 3.

Fig. 8 is a side view of the fulcrum member.

Fig. 9 is a side view of the fulcrum member in open or hanging position.

Fig. 10 is a sectional view on the line 10—10, Fig. 4.

Referring to the drawings, 1 designates a wheel rim; 2, a pneumatic tire shoe; and A is a tool by which the shoe is placed on the rim.

The tool is in the form of a prying device or lever, which is composed of an arched frame 3 having a handle 4 rigidly secured thereto, and a fulcrum member 5 hingedly connected with the frame at one end so that the lever can be brought into proper relation with the side of the wheel. At the opposite end of the frame are adjustable devices 6 for engaging the bead portions $2^a$ and $2^b$ of the tire to pry the same on the rim.

The frame 3 is formed of two arched rods 8 disposed parallel with each other and connected together rigidly by cross pieces 9, 10 and 11, to the last two of which is fastened the shank 12 of the handle 4. The crosspiece 9 has apertures 13 through which slides the stems 14 of the member 6 which engages the bead portions of the tire. The stems 14 are connected with a crosshead 15 so that both stems will move together. Extending laterally through the crosshead is a screw 16 fastened at 17 to the crosspiece 9. On this screw is a wing nut 18 whereby the crosshead 15 and the device 6 can be moved toward the fulcrum of the lever, which is necessary for adapting the tire replacer for use when applying the first or inner bead portion of the tire. A spring 19 on the screw 16 moves the crosshead 15 outwardly when the nut 18 is unscrewed, so as to thereby carry the device 6 away from the fulcrum of the lever when adapting the tire replacer for engagement with the second or outer bead of the tire.

The fulcrum member 5 is a U-shaped structure having a roller 20 which is adapted to bear on the felly of the wheel to act as the fulcrum points, said roller being preferably of rubber so as not to mar the finish. The fulcrum member 5 has apertured lugs 21 through which extends an axle or shaft 22 rotatable in bushings 23 pinned in elbow brackets 24 rigidly fastened to the arched rods 8. This hinged joint is necessary in order to permit the tire replacer to be opened so that it can be spanned over the tire and wheel, the position of the member 5 when the replacer is open being indicated in Fig. 6. When the replacer is closed the fulcrum member 5 occupies the position shown in Figs. 1, 2, 4 and 5, it being locked in this position by a locking member 25 which engages at 26 the shoulder 27 on the member 5. The locking member 25 has a ring-like lug 28 in which fits an eccentric 29 on the shaft or axle 22, so that by turning the shaft the locking element 25 is turned from the position shown in Fig. 8 to that shown in Fig. 9, or vice versa. The locking member is adapted to bear against a stop 30 which is pinned to the bushings 23, whereby the arm 5 is rigidly held in the fulcruming position, shown in Fig. 1.

In using the device, the roller-carrying member 5 is unlocked so it will hang in the position shown in Fig. 6. The tire replacer in this open condition is placed over the tire and wheel in spanning relation. The member 5 is now thrown inwardly to the position shown in Fig. 1 and is locked by the turning of the knob 31 of the shaft 22. The wing nut is now turned so as to move the tire-gripping fingers or member 6 into engagement with the innermost bead portion, as shown in Fig. 1. Now, by an upward movement of the handle 4 the device swings about the center of the roller 20 as an axis. In so doing the tire is pried outwardly and laterally into engagement with the rim 1. This operation is repeated at about four points around the circumference of the wheel to place the first bead of the tire into holding engagement with the rim. The thumbscrew is now turned so as to move the fingers 6 outwardly so that they can be accommodated to the second bead portion of the tire, as shown in Fig. 2. The handle 4 is now raised upwardly as before so as to pry the tire over the rim. In this manner the tire can be easily and quickly applied to the wheel rim.

From the foregoing description, taken in connection with the accompanying drawings, the advantages of the construction and method of operation will be readily understood by those skilled in the art to which the invention appertains; and while I have described the principle of operation of the invention, together with the device which I consider to be the best embodiment thereof, I desire to have it understood that the device shown is merely illustrative and that such changes may be made when desired as are within the scope of the appended claims.

Having thus described my invention, I claim as new and desire to secure by Letters Patent:

1. A tool of the class described comprising an arched frame, a member hingedly connected therewith, a fulcrum roller on the member, a lock for holding the member projecting laterally under the frame, and means on the frame adjustable to and from the roller for engagement with either bead portion of a tire while the roller bears on the felly of a wheel to which the tire is being applied.

2. A tool of the class described comprising an arched frame, tire-engaging means on one end of the frame, a shaft on the other end of the frame, a fulcrum member adapted to swing around the shaft as a center, a stop associated with the frame, a locking element pivoted on the shaft to interlock between the said stop and fulcrum member, and means connected with the shaft for moving the locking element into and out of locking position whereby the fulcrum member can be moved into and out of engagement with the wheel felly to which the tire is being applied.

CHRISTIAN C. F. REININGER.

Copies of this patent may be obtained for five cents each, by addressing the "Commissioner of Patents, Washington, D. C."